United States Patent
Ostino et al.

(10) Patent No.: US 12,480,408 B2
(45) Date of Patent: Nov. 25, 2025

(54) HIGH-PRESSURE TURBINE VANE INCLUDING A CAVITY UNDER A SQUEALER TIP

(71) Applicant: SAFRAN, Paris (FR)

(72) Inventors: Leandre Ostino, Moissy-Cramayel (FR); Romain Pierre Cariou, Moissy-Cramayel (FR); Filippo Pagnoni, Moissy-Cramayel (FR); Sylvain Paquin, Moissy-Cramayel (FR); Adrien Bernard Vincent Rollinger, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/256,372

(22) PCT Filed: Dec. 8, 2021

(86) PCT No.: PCT/FR2021/052242
§ 371 (c)(1),
(2) Date: Jun. 7, 2023

(87) PCT Pub. No.: WO2022/123177
PCT Pub. Date: Jun. 16, 2022

(65) Prior Publication Data
US 2024/0018872 A1    Jan. 18, 2024

(30) Foreign Application Priority Data
Dec. 10, 2020 (FR) .................................... 20 12855

(51) Int. Cl.
*F01D 5/20* (2006.01)
*B22F 10/28* (2021.01)
(Continued)

(52) U.S. Cl.
CPC ............... *F01D 5/20* (2013.01); *B22F 10/28* (2021.01); *B23K 26/342* (2015.10);
(Continued)

(58) Field of Classification Search
CPC ... F01D 5/20; F01D 5/18; F01D 5/186; F01D 5/187; F01D 25/12; F05D 2240/307;
(Continued)

(56) References Cited

U.S. PATENT DOCUMENTS 6,224,337 B1 *   5/2001   Lieland ..................... C23C 4/01
                                                    416/241 B
7,997,865 B1 *   8/2011   Liang ...................... F01D 11/00
                                                    416/92
(Continued)

FOREIGN PATENT DOCUMENTS

FR      3 037 829 A1    12/2016
FR      3 037 972 A1    12/2016

OTHER PUBLICATIONS

International Search Report issued Mar. 23, 2022 in PCT/FR2021/052242 filed on Dec. 8, 2021, 2 pages.

*Primary Examiner* — Andrew J Marien
(74) *Attorney, Agent, or Firm* — Oblon, McClelland, Maier &Neustadt, L.L.P.

(57) ABSTRACT

The invention relates to a method for manufacturing a vane (11) of a turbine engine comprising a pressure-face wall (14) and a suction-face wall (15) spaced apart from one another, this vane (11) comprising a tip (S) with:
a bottom wall (18) extending from the pressure-face wall (14) to the suction-face wall (15), each of which comprises a free edge (19, 21) extending beyond this bottom wall (18) to delimit, together with this bottom wall (18), a squealer shape (B);
a partition wall (22) extending from the pressure-face wall (14) to the suction-face wall (15) and spaced apart from
(Continued)

the bottom wall (18) to delimit, together with this bottom wall (18), a cavity (C) under the squealer tip;
the method including:
a moulding step to form at least the pressure-face wall (14), the suction-face wall (15) and the partition wall (22);
a step of forming the bottom wall (18) using an additive manufacturing method by adding metal material.

15 Claims, 5 Drawing Sheets

(51) Int. Cl.
  B23K 26/342 (2014.01)
  B23P 15/00 (2006.01)
  B33Y 80/00 (2015.01)
  F01D 5/18 (2006.01)
  F01D 25/12 (2006.01)
(52) U.S. Cl.
  CPC ............ *B23P 15/006* (2013.01); *B33Y 80/00* (2014.12); *F01D 5/18* (2013.01); *F01D 5/186* (2013.01); *F01D 5/187* (2013.01); *F01D 25/12* (2013.01); *F05D 2230/30* (2013.01); *F05D 2230/31* (2013.01); *F05D 2240/307* (2013.01); *F05D 2260/607* (2013.01); *Y10T 29/49321* (2015.01)
(58) Field of Classification Search
  CPC ........... F05D 2260/607; F05D 2230/30; F05D 2230/31; B22F 10/28; B23K 26/342; B23P 15/006; B33Y 80/00; Y10T 29/49321
  See application file for complete search history.

(56) References Cited

U.S. PATENT DOCUMENTS

| | | | |
|---|---|---|---|
| 10,370,982 B2* | 8/2019 | Roberts | F01D 5/187 |
| 2015/0034266 A1* | 2/2015 | Bruck | B22D 23/06 |
| | | | 164/76.1 |
| 2016/0375610 A1 | 12/2016 | Vollebregt et al. | |
| 2018/0161872 A1* | 6/2018 | Brunhuber | B22F 7/06 |
| 2018/0236556 A1 | 8/2018 | Garay et al. | |
| 2018/0298763 A1* | 10/2018 | Lee | F01D 5/20 |
| 2019/0211684 A1* | 7/2019 | Burbaum | B22F 3/1125 |
| 2020/0080427 A1* | 3/2020 | Mongillo | F01D 5/20 |
| 2020/0256196 A1* | 8/2020 | Niezelski | F01D 5/187 |
| 2022/0341325 A1* | 10/2022 | Charpentier | B23P 6/007 |

* cited by examiner

ND A CAVITY UNDER A
HIGH-PRESSURE TURBINE VANE INCLUDING A CAVITY UNDER A SQUEALER TIP

TECHNICAL FIELD

The invention relates to the manufacture of a vane of a turbine engine such as a vane of a turbojet engine, turboprop engine, helicopter gas turbine, or APU (Auxiliary Power Unit), or a vane of an industrial gas turbine.

PRIOR ART

In a turbojet engine, given the reference numeral 1 in FIG. 1, the air enters an intake duct 2 to pass through a fan including a series of rotating blades 3 before splitting into a central primary flow and a secondary flow encircling the primary flow.

The primary flow is compressed by compressor stages 4 and 6 before reaching a combustion chamber 7, after which it is expanded by passing through turbines 8, before being discharged while generating thrust. The secondary flow is directly propelled by the fan to generate the main thrust.

Each turbine 8 includes series of radially-oriented vanes evenly spaced about a rotating shaft AX rotatably mounted in an outer casing 9 surrounding the assembly.

The vanes are cooled by circulating air in each vane, which air is sourced, for example, at the compressor or in the secondary flow and enters at the vane root, this air being discharged through holes made through the walls of these vanes.

Such a vane includes a bathtub-shaped tip known as a squealer tip, which can include a cavity thereunder in which air is circulated to improve the cooling of the tip.

As a result, such a vane has complex internal and external shapes, making the manufacture thereof by foundry work difficult: each hollow portion must be delimited by a core that must be rigidly held in a mould during the casting operation. In practice, the complexity of the shape of a vane including a cavity under the squealer tip makes the manufacture thereof by foundry work particularly difficult, and thus costly.

In this context, the aim of the invention is to provide a solution to simplify the manufacture of a vane including a cavity under the squealer tip that improves the cooling of the vane tip.

DISCLOSURE OF THE INVENTION

To this end, the invention relates to a method for manufacturing a vane of a turbine engine comprising a pressure-face wall and a suction-face wall spaced apart from one another, this vane comprising a tip with:
a bottom wall extending from the pressure-face wall to the suction-face wall, the pressure-face wall and the suction-face wall each comprising a free edge extending beyond this bottom wall to delimit, together with this bottom wall, a squealer shape at the tip of the vane;
a partition wall extending from the pressure-face wall to the suction-face wall and spaced apart from the bottom wall to delimit, together with this bottom wall, a cavity under the squealer tip;
the method including:
a moulding step to form at least the pressure-face wall, the suction-face wall and the partition wall;
a step of forming the bottom wall using an additive manufacturing method by adding metal material.

This solution allows a cavity to be formed under the squealer tip without the need for a complex core arrangement in order to form the rough part, which significantly simplifies the moulding operation and reduces the scrap rate during production.

The invention further relates to a method thus defined, wherein the additive manufacturing method is a laser-fused metal powder deposition method.

The invention further relates to a method thus defined, including the formation of dust holes in the bottom wall.

The invention further relates to a method thus defined, wherein the dust holes in the bottom wall are obliquely oriented towards the edges of the pressure-face and/or suction-face walls.

The invention further relates to a method thus defined, including the formation, in the partition wall, of dust holes which are offset from the dust holes in the bottom wall.

The invention further relates to a method thus defined, wherein the distance between each dust hole in the partition wall and the periphery of the vane formed by the pressure-face and suction-face walls is shorter than the distance between the corresponding dust hole in the bottom wall and the periphery of the vane.

The invention further relates to a method thus defined, including the formation of dust holes made through the bottom wall, each dust hole in the bottom wall being located facing a dust hole in the partition wall.

The invention further relates to a method thus defined, wherein the same number of dust holes are formed through the bottom wall as there are dust holes through the partition wall.

The invention further relates to a method thus defined, including the formation, in the vane, of an air supply duct to the cavity under the squealer tip.

The invention further relates to a vane of a turbine engine obtained using a method thus defined.

The invention further relates to a turbine engine comprising a vane thus defined.

DETAILED DISCLOSURE OF PARTICULAR EMBODIMENTS

Figure 1:
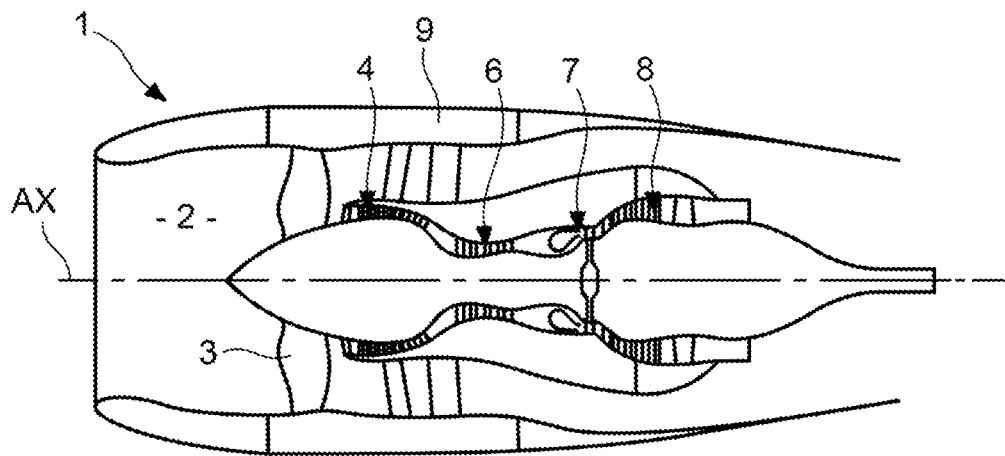
FIG. 1 is a longitudinal sectional view of a known turbojet engine.
Figure 2:
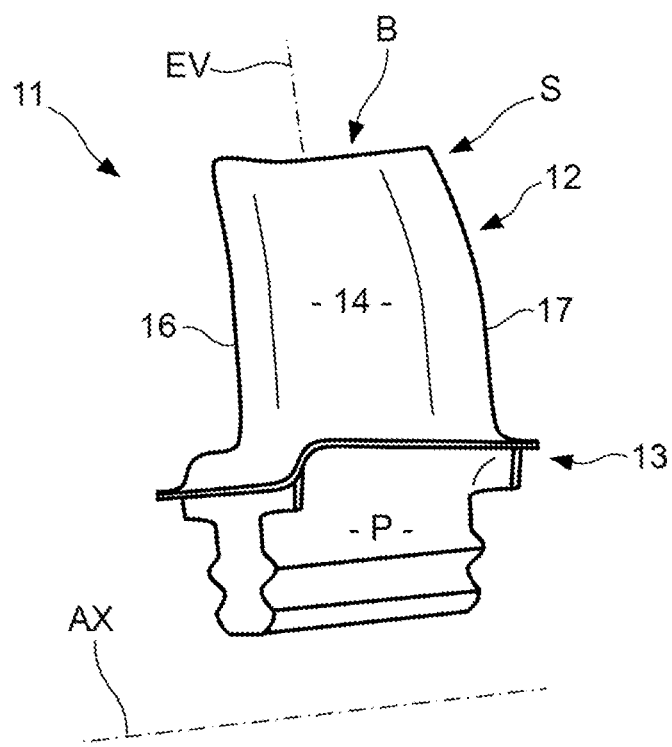
FIG. 2 is a comprehensive, perspective view of a vane according to the invention.

In FIG. 2, a vane according to the invention, given the reference numeral 11, comprises a root P through which it is secured to a rotor element not shown, and a blade 12 supported by this root P, the root and the blade being separated by a platform 13.

The blade 12 has a shape twisted about a so-called spanwise axis EV which is perpendicular to the axis AX. It comprises a base via which it is connected to the platform 13 and which extends radially as far as a tip S constituting the free end of this blade 12.

The two main walls of the blade 12, which are the pressure-face wall 14 and the suction-face wall 15 thereof, are spaced apart from one another in the central part of the vane 11, and join at the leading edge 16 of the vane 11 and at the trailing edge 17 of this vane 11.

The tip S of the vane 11 includes a bottom wall 18 substantially normal to the direction EV, which extends from the pressure-face wall to the suction-face wall. This bottom wall (see FIG. 3) is set back towards the axis AX relative to the terminal ends of the free edges 19 and 21 of the pressure-face wall 14 and suction-face wall 15. This bottom wall 18 delimits, together with these edges 19 and 21, a hollow portion that is open in the opposite direction to the axis AX, referred to as a squealer tip and given the reference B, which is located at the tip S.

Figure 3:
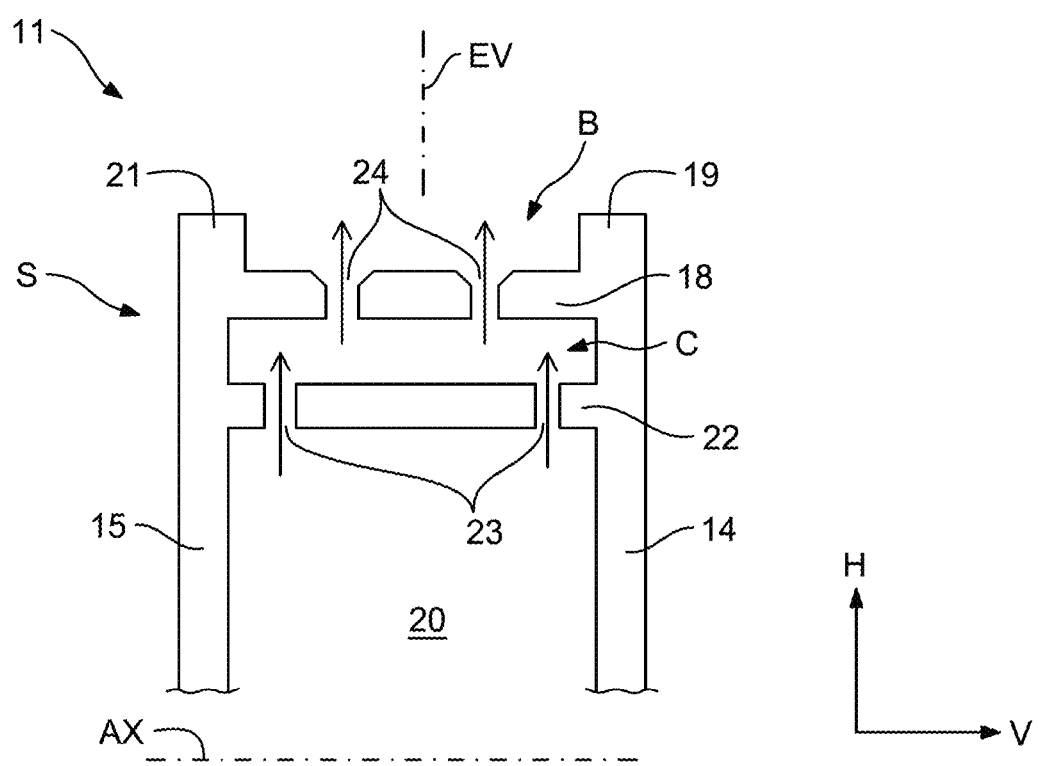
FIG. 3 is a sectional view along a plane normal to the axis of rotation of a vane according to a first embodiment of the invention.

As shown FIG. 3, the vane includes a cavity C under the squealer tip, delimited in the direction EV by the bottom wall 18 and by a partition wall 22 extending from the pressure-face wall 14 to the suction-face wall 15, while being spaced apart from this wall 18 and substantially parallel thereto.

The vane 11 includes cooling ducts located between the pressure-face wall 14 and the suction-face wall 15, which extend between the root P and the partition wall 22 essentially in the spanwise direction EV. These ducts are supplied with cool air collected at the root P to cool the various regions of the vane.

The air flowing through these ducts, given the reference numeral 20 in the figures, is discharged through dust holes 23 made through the partition wall 22, and then through complementary dust holes 24 made through the bottom wall 18. The air from the cooling ducts thus enters the cavity C under the squealer tip via the holes 23, and is discharged to the squealer tip B through the holes 24. This dust-removing air thus cools the cavity C under the squealer tip and the bottom wall 18, i.e. the vane tip, without having to increase the flow rate of the air to the vane for the cooling thereof.

The dust holes such as the holes 23 and 24 have a larger section than other vane-cooling holes, so as to ensure that dust or impurities present in the cool air collected at the root of the vane and originating from the outside environment are removed outside the vane.

In order to ensure that dust is effectively removed from the vane, each dust hole 24 in the bottom wall 18 is located facing a corresponding dust hole 23 in the partition wall 22 in the direction EV, and the number of dust holes in the bottom wall is identical to the number of dust holes in the partition wall. More generally, the total section of the holes in the bottom wall is equal to the total section of the holes in the partition wall so as to ensure dust is effectively removed.

Figure 4:
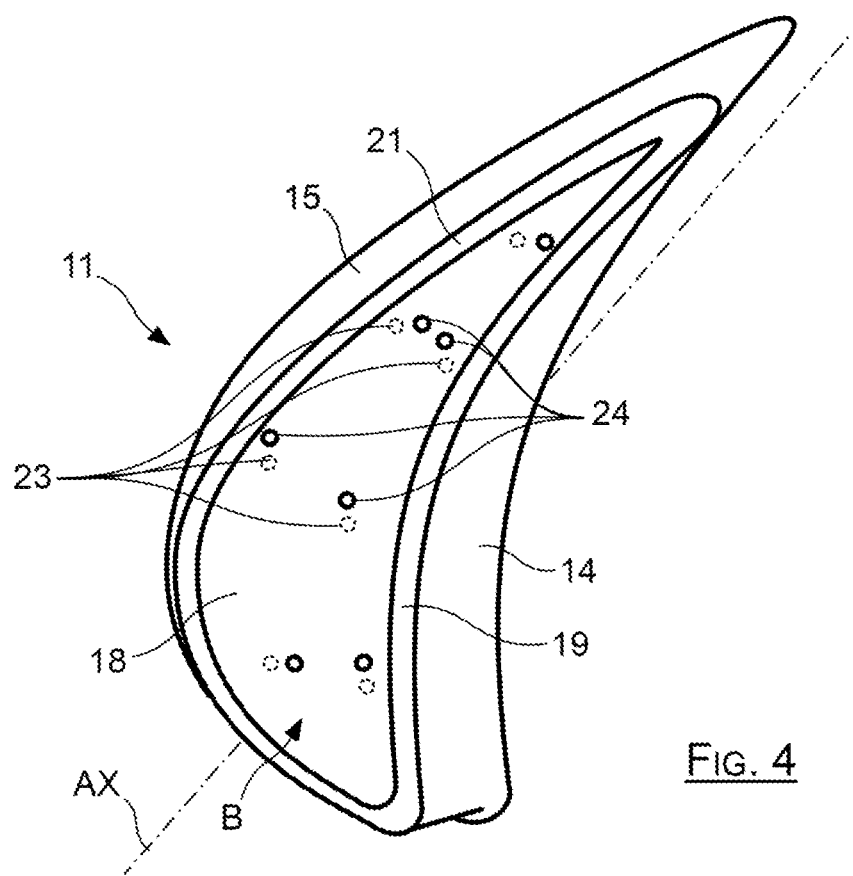
FIG. 4 is a perspective view of the tip of a vane according to the first embodiment of the invention.
Figure 5:
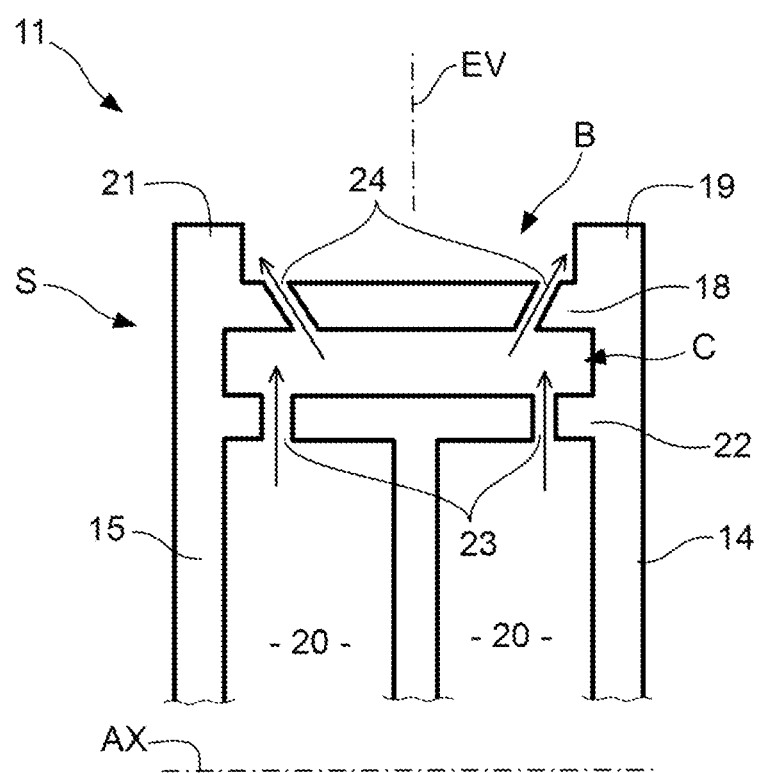
FIG. 5 is a sectional view along a plane normal to the axis of rotation of a vane according to a second embodiment of the invention.

Alternatively, and as shown in FIGS. 3 and 4, the dust holes 23 and 24 are offset from one another, so that the air from the holes 23 entering the cavity C under the squealer tip forms jets oriented towards the bottom wall 18 to provide impingement cooling for this bottom wall 18. Impingement cooling provides an increased heat exchange coefficient, thereby ensuring effective cooling.

More particularly, and as shown in FIG. 4, each hole 24 formed in the bottom wall 18 is offset from the corresponding hole 23 formed in the partition wall, i.e. the projection of a hole 23 onto the bottom wall 18 in the spanwise direction EV is located at a distance from the corresponding hole 24 formed in this bottom wall 18.

In the example shown in FIGS. 3 and 4, the dust holes formed in the walls 18 and 22 extend in the spanwise direction EV. However, it can be advantageous for the holes 24 formed in the bottom wall 18 to extend obliquely to the spanwise direction, so as to provide air jets that are oriented towards the edges 19 and 21 so as to cool them.

To increase the cooling of the edges 19 and 21, each hole 23 formed in the partition wall is thus advantageously located facing a corresponding hole 24 formed in the bottom wall 18, in the spanwise direction. The jet of air generated by a hole 23 is thus oriented directly towards a corresponding hole 24 so as to pass therethrough almost directly to ensure effective cooling of the portion of the edge 19 or 21 ventilated by this obliquely-oriented hole 24. Thus, advantageously, each hole in the partition wall opens out at least in part onto a corresponding hole in the bottom wall, which also allows for impingement cooling before the dust is removed. The orientation of the holes 24 towards the edges 19 and 21 ensures impingement cooling of these edges.

In this case, the cooling air originating from the holes 23 does not impact the bottom wall 18: the cooling of the edges is thus favoured over that of the cavity C under the squealer tip.

Figure 6:
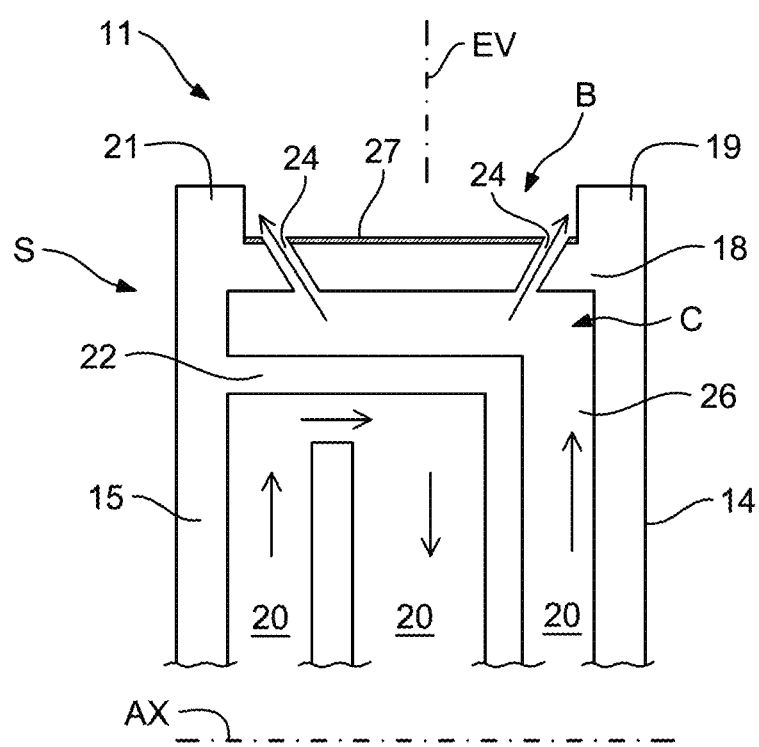
FIG. 6 is a sectional view along a plane normal to the axis of rotation of a vane according to a third embodiment of the invention.

As shown in FIG. 6, the cooling of the edges 19 and 21 can be further increased by providing a duct 26 opening directly out into the cavity C under the squealer tip to supply it with a greater flow of cool air, in order to increase the flow rate of the dust holes 24 oriented towards the edges 19 and 21.

In order to increase the thermal resistance of the vane, the outer face of the bottom wall 18 can be covered with a thermal barrier coating 27.

According to the invention, the vane 11 is obtained by firstly manufacturing a rough part from foundry work forming a body of the vane comprising the root P thereof, the pressure-face wall 14 and suction-face wall 15, and at least the partition wall 22, and then by forming the bottom wall 18 by additive manufacturing on this rough part to delimit the cavity C under the squealer tip as well as the squealer tip B.

The rough part is obtained by foundry work, using a mould and a set of cores comprising at least two elements spaced apart from one another in the spanwise direction EV by a distance corresponding to the thickness of the partition wall. These core elements are installed in the mould such that they are away from the inner faces of this mould to delimit, together with these inner faces, the pressure-face wall 14 and suction-face wall 15.

The bottom wall 18 is formed by positioning the rough part in a gripping tool, before positioning, in the vicinity of the partition wall 22, deposition equipment mainly comprising a metal powder deposition nozzle and a laser beam to fuse the deposited powder.

Such equipment enables an additive manufacturing operation to be carried out using the so-called LMD (Laser Metal Deposition) method. Other equipment can be provided in order to form the partition wall 22 by additive manufacturing, according to the LMD method or according to other similar methods.

Successive metal layers are thus deposited and fused together to form the bottom wall 18 in a homogeneous manner, the equipment being capable of moving in order to cover the entire span of the bottom wall 18 to be formed via a sweeping motion. Optionally, the vane can be positioned such that the spanwise axis EV thereof extends in a horizontal direction or is substantially inclined during this operation for adding metal material, so that the wall is formed by additive manufacturing in a direction close to the vertical, so as to minimise back draft angles during the process.

After being formed by adding metal material, this bottom wall 18 can optionally be reworked by machining, for example by electrical discharge machining or chemical treatment, to reduce the roughness of the outer surface of this bottom wall and thus reduce the external heat exchange coefficient, thus reducing the heating of the surface.

Advantageously, the bottom wall 18 is formed by adding metal material so as to have a thickness that is not constant, so as to delimit, for example, at the inner face thereof, i.e. the face located the closest to the root P, a recess at each dust hole. Each recess thus forms an enlarged mouth of the corresponding dust hole to encourage the intake of air originating from the cavity C under the squealer tip. These recesses thus allow the number of holes 24 formed in the bottom wall 18 to be reduced, and/or the section of these holes to be reduced in order to increase the speed of the air within the cavity under the squealer tip to improve the cooling thereof.

The invention claimed is:

1. A method for manufacturing a vane of a turbine engine comprising a pressure-face wall and a suction-face wall spaced apart from one another, this vane comprising a tip with:
   a bottom wall extending from the pressure-face wall to the suction-face wall, the pressure-face wall and the suction-face wall each comprising a free edge extending beyond this bottom wall to delimit, together with this bottom wall, a squealer shape at the tip of the vane;
   a partition wall extending from the pressure-face wall to the suction-face wall and spaced apart from the bottom wall to delimit, together with this bottom wall, a cavity under the squealer tip;
   the method including:
   moulding to form at least the pressure-face wall, the suction-face wall, and the partition wall; and
   forming the bottom wall directly on the pressure-face wall and the suction-face wall formed by the moulding using an additive manufacturing method by adding metal material,
   wherein the forming the bottom wall using the additive manufacturing method includes orienting the vane such that a spanwise axis of the vane extends in a horizontal direction during the additive manufacturing.

2. The method according to claim 1, wherein the additive manufacturing method is a laser-fused metal powder deposition method.

3. The method according to claim 1, further comprising forming first dust holes in the bottom wall.

4. The method according to claim 3, wherein the first dust holes in the bottom wall are obliquely oriented towards the edges of the pressure-face wall and/or suction-face wall.

5. The method according to claim 3, further comprising forming, in the partition wall, second dust holes which are offset from the first dust holes in the bottom wall.

6. The method according to claim 5, wherein a distance between each of the second dust holes in the partition wall and a periphery of the vane formed by the pressure-face wall and suction-face wall is shorter than a distance between the corresponding first dust hole in the bottom wall and the periphery of the vane.

7. The method according to claim 5, wherein each of the first dust holes in the bottom wall is located at least in part facing the corresponding second dust hole in the partition wall.

8. The method according to claim 5, wherein a same number of the first dust holes are formed through the bottom wall as there are of the second dust holes through the partition wall.

9. The method according to claim 1, further comprising forming, in the vane, an air supply duct to the cavity under the squealer tip.

10. The vane of a turbine engine obtained using the method according to claim 1.

11. The turbine engine comprising the vane according to claim 10.

12. The method according to claim 1, wherein the bottom wall is normal to a spanwise axis of the vane, and a shape of the vane is twisted about the spanwise axis.

13. The method according to claim 1, wherein the bottom wall is parallel to the partition wall.

14. The method according to claim 1, wherein an outer face of the bottom wall is covered with a thermal barrier coating.

15. The method according to claim 1, wherein the bottom wall is formed using the additive manufacturing method such that a thickness of the bottom wall is not constant.

* * * * *